United States Patent Office 2,987,007
Patented June 6, 1961

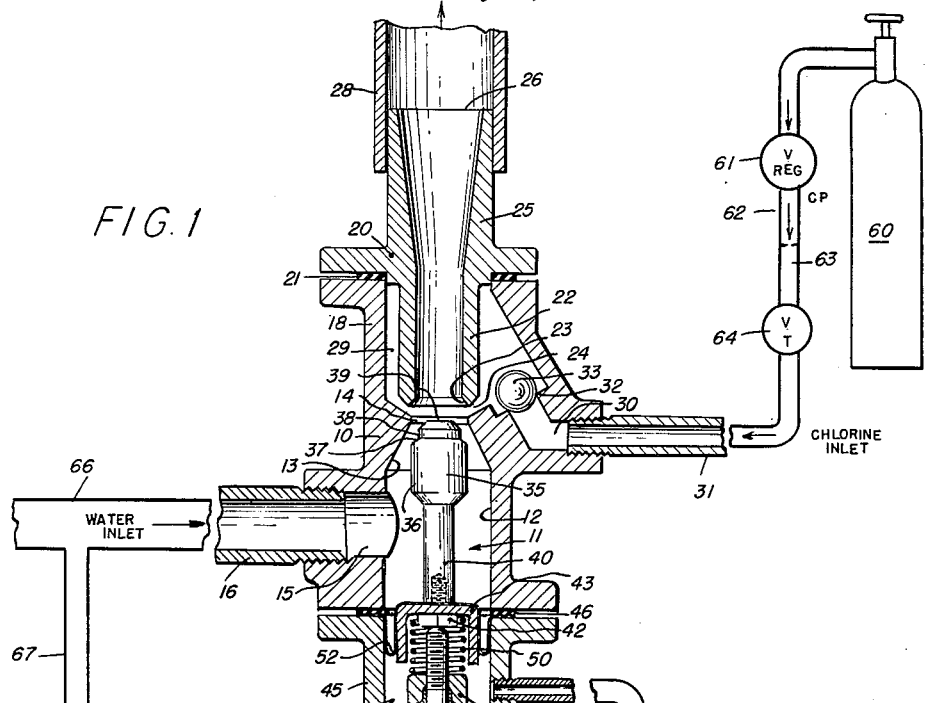
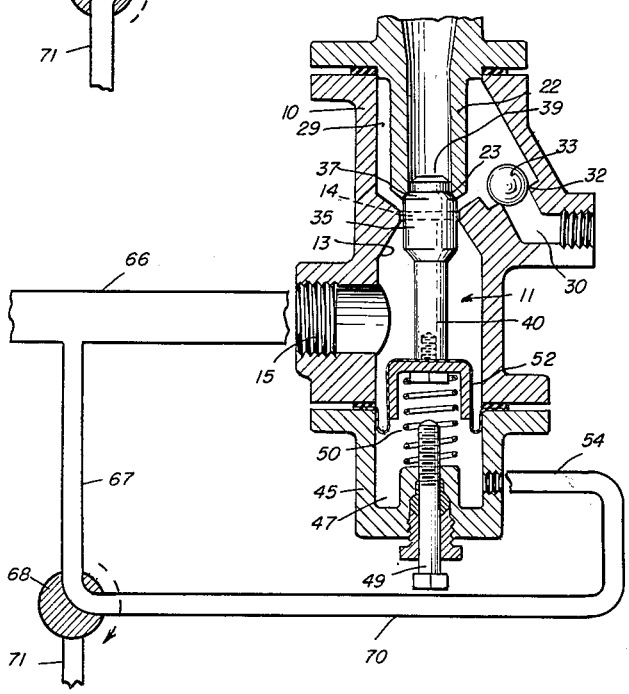
INVENTOR.
William C. Conkling
BY Robert S. Dunham
Attorney

2,987,007
INJECTOR
William C. Conkling, Essex Fells, N.J., assignor to Wallace & Tiernan Inc., a corporation of Delaware
Filed July 30, 1957, Ser. No. 675,066
4 Claims. (Cl. 103—271)

This invention relates to injector devices for feeding one fluid into another and more particularly relates to an injector, operating on the principle of a venturi and functioning in the general manner of an aspirator, for feeding a gas such as chlorine into a flow of aqueous liquid such as water, to provide a relatively high concentration of chlorine, e.g. in solution, in the liquid leaving the device.

Injectors are employed, for example, in chlorinators where a concentrated solution of chlorine is produced in a minor flow of water that is continuously advanced to the main or other body of liquid to be treated. Such an injector essentially comprises a venturi having a throat apertured for communication with a chlorine gas supply conduit; flow of water through the venturi creates a negative pressure or partial vacuum at the throat whereby the gas is drawn into the water.

In certain uses of chlorinators, it is necessary to shut off the feed of chlorine solution at appropriate times, for example where chlorination is performed on a program basis with the operation initiated and arrested at desired intervals by manual or automatic control. A particular purpose of the present device is to afford new, simpler and more effective means of arresting solution feed and chlorine flow, particularly, as explained below, under conditions where simple interruption of water flow to the injector may not immediately interrupt the feed of chlorine.

In chlorinators of the common vacuum type, the regulating and metering instrumentalities located upstream of the injector in the chlorine flow path are conventionally so designed that they will automatically interrupt the gas flow if the injector suction ceases. Hence a simple valve to cut off water supply to the injector can be used to stop and start chlorination, providing the remainder of the minor flow line, acting as a static line between the injector and the point of application of the chlorine solution, is at atmospheric pressure or above.

In many cases, however, the connections or circumstances are such that the discharge line of the injector is at an appreciable negative pressure, i.e. exhibits a partial vacuum or sub-atmospheric pressure, under shutdown conditions. For example, a continuing vacuum or suction may obtain when the injector discharge conduit is connected into the suction side of a pump or when such conduit runs downward into an open conduit, tank or well containing the aqueous liquid to be chlorinated. Then if the water flow is merely interrupted upstream of the injector, there will be a continuing flow of chlorine into the device because of a siphon or siphon-like action, displacing the water in the injector discharge line. Undissolved chlorine gas may then reach the point of application, i.e. the normal point of feed of the chlorine solution, in a steady flow; alternatively chlorine gas filling the discharge line will be advanced into the region of application upon the next start-up, should the siphon action have been gradually broken by the substitution of gas for liquid in this line.

In this way, chlorination is not interrupted immediately as desired, and indeed may continue for some time after an intended shut-down. Furthermore, when it is desired to initiate chlorination again, proper start-up of chlorine solution may be difficult because of the prior displacement of the water out of the injector tail pipe. In addition, the presence or release of undissolved gas at the point of desired application of chlorine solution may cause harmful corrosion, particularly over a long series of stops and starts.

Some prior injectors have included a valve element (used for shutting off flow upstream of the suction aperture) which is also so positioned in the vicinity of the nozzle (inlet) or throat of the venturi, that it can be moved to adjust the water flow and consequently the injector suction, i.e. to achieve an optimum value of the latter. Such arrangements, however, in no way overcome the problem of siphon or similar action as explained above.

In consequence a particular object of the present invention is to provide new and simplified instrumentalities for flow adjustment through the injector and for positive interruption of water flow, with provision at the same time for effectively shutting off the flow of chlorine gas to the solution discharge line.

To these and other ends, the improved injector device of the invention comprises a passage structure for the flow of fluid, e.g. water, into which another fluid such as chlorine gas is to be drawn. The passage structure is internally shaped to provide a venturi, having a throat suitably apertured to receive the added fluid, for instance as supplied to a jacket or conduit around the opening, from an appropriate source such as the regulating and metering means of a chlorinator. Upstream of the apertured throat the passage structure is arranged to constitute a nozzle, i.e. as being internally tapered toward the throat, while at the downstream side the water continues through an outlet passage element, having an opening aligned with the opening of the nozzle and shaped to constitute a valve seat. A valve plug is mounted to move from a position upstream of the nozzle opening, through a range of localities where it modifies or adjusts the flow through the venturi, to a position where it engages and closes the seat of the outlet passage element. Thus the outlet passage, downstream of the venturi throat, is dimensioned to be closed by the valve plug, while the nozzle (or upstream passage) and the valve plug itself are mutually dimensioned to allow the plug to traverse the nozzle and seat in the outlet.

Very preferably, the nozzle opening is at least slightly larger than the periphery of the plug. With a check valve in the gas supply conduit to the suction aperture, a closure of the plug valve then not only interrupts the flow of water downstream (rather than upstream) of the venturi throat, but also effectively shuts off the flow of gas because the full pressure of water is available to keep the check valve closed.

Conveniently the valve plug is mounted on a stem coaxial with the venturi passage and extending from the upstream side of the plug, in cooperation with means for adjustably positioning this valve element to control the flow through the injector, such means preferably including an arrangement for rapidly advancing the plug to closed position against the valve seat of the outlet. Such adjusting and actuating means may include a supplemental chamber, separated from the injector passage by diaphragm or other movable wall means to which the valve stem is connected, so that by or with the aid of a supply of fluid under pressure to the supplemental chamber, a fast closing of the valve element can be achieved.

As will be further apparent below, the described device affords a simple and effective improvement in injectors, satisfactorily accomplishing the multiple functions of flow adjustment, water flow shut-off, and positive interruption of gas flow to the solution or minor flow line.

Referring to the drawing, which illustrates one example of the invention:

FIG. 1 is a view, chiefly in vertical section, of the injector device, with diagrammatic illustration of supplemental elements of a system in which the device is of special advantage, the injector being shown in its open or normal operating condition; and FIG. 2 is a fragmentary view of the principal parts of the injector device, as seen in FIG. 1 but with the plug valve element in closed position.

As shown, the injector comprises a main body element 10 having a water inlet chamber 11 formed by a cylindrical recess 12 which at one end has a taper 13, of frusto conical shape, to constitute a nozzle having a circular opening 14. This opening 14 may have a shallow cylindrical portion, as shown, at the downstream end of the tapered portion 13. The chamber 11 has at one side a port 15 into which a pipe 16 may be fitted, for inlet of fluid, e.g. water. At the further end of an enlarged extension 18 of the member 10, an outlet fitting 20 is secured, for example by appropriate flanges on the respective parts with an intervening gasket 21. The fitting 20 is essentially of tubular shape and constitutes an outlet passage device from which a cylindrical tube portion 22 projects into the enlarged structure 18 and terminates with an internally beveled, circular opening 23. The opening 23, shaped to afford a valve seat as described below, is aligned with the nozzle opening 14 but spaced a small distance therefrom to provide the throat aperture 24 of the injector.

The member 20 has a further tubular portion 25 downstream of the passage part 22, and having a long outward flare, i.e. a gradual taper, toward the open downstream end 26. This tapered passage constitutes the outlet of the venturi and is preferably shaped as shown, with the outward taper beginning at a locality spaced from the throat, the immediate outlet of the latter being the cylindrical passage 22. For delivery of liquid from the injector, a discharge pipe 28 is fitted to the outlet structure 25.

The portion 18 of the member 10 is shaped to provide a passage 29 around the outlet tube 22 and the throat aperture 24, for ready access of the second fluid, e.g. chlorine gas, to the aperture 24. The member 10 also includes a gas inlet passage 30 into which a supply tube 31 may be fitted and which opens into the passage 29 through an appropriate seat 32 for a valve ball 33, thus operable as a check valve intermediate the chlorine inlet tube 31 and the venturi aperture 24.

For adjusting the flow through the injector and for complete shut-off at desired times, the device includes a valve plug 35, normally located within the tapered or cone-shaped region 13 of the injector nozzle. The plug 35 is a generally cylindrical member shaped at or near one end to seat in the opening 23 for effective closure of the latter. A specifically preferred configuration of the plug, for optimum flow control as well as for the desired closing function, is indicated in the drawings, and consists of a cylindrical body portion 36 having a curved shoulder 37 designed to seat smoothly and tightly against the outlet 23. A very short cylindrical portion 38, of reduced diameter, extends beyond the shoulder 37, having a flat end 39 with a beveled or curved peripheral edge. The projecting portion 38 is dimensioned to pass freely within the outlet opening, so that the shoulder 37 can abut the seat 23, but the projection cooperates with the main body 35 and shoulder 37, i.e. in the configuration of the surfaces of all these parts, to afford desirable flow characteristics through the nozzle portion 13 of the injector.

The plug 35 is carried on a stem 40 which is secured, by a bolt 42, to the center of a rigid cup-shaped member 43.

The end of the injector chamber 11 is closed by a hollow cylindrical member 45, which is secured to the member 10 with appropriate flanges and an intermediate gasket 46, the cavity 47 of the member 45 providing a supplemental valve-actuating chamber. The closed end of the member 45 has an inner boss 48 in which a stop screw 49 is threaded, to abut the bolt 42 at the end of the valve plug assembly. A coil spring 50, under compression between the lower inside face of the cup element 43 and the upper face of the boss 48, biases the valve assembly upward.

The chambers 11 and 47 are separated by appropriate means providing a movable wall between them, preferably comprising a flexible diaphragm. Thus a thin diaphragm 52, sealed (with the gasket 46) at its outer edge between the cooperating flanges of the members 10 and 45 extends across the outer face of the cup member 43, being secured between it and the valve stem 40. This diaphragm, which moves with the valve assembly, may consist of a highly flexible member of rubber or synthetic material having a pre-shaped configuration including a deep annular convolution as shown, whereby it normally tends to embrace the member 43 and also to lie along the inner wall of the chamber 47.

In operation, when the chamber 47 is at atmospheric or other lower pressure and when water is traversing the injector through the chamber 11, the positive pressure of the water is normally effective on the diaphragm and the cup member 43, to hold the valve plug assembly against the end of the stop screw 49, thus overcoming the force of the spring 50. Under such circumstances, adjustment of the screw 49, by turning it, varies the position of the valve plug assembly in a direction longitudinal of its axis, i.e. so as to move the plug 35 further into or out of the nozzle 13 and its throat opening 14.

In this way the extent of suction or negative pressure developed at the gas intake aperture 24 of the venturi is adjusted and set by axial adjustment of the valve plug 35, i.e. by changing the position of the plug along the axis of the injector.

The design of the injector, including its nozzle 13, may conveniently be such that the valve plug 35 necessarily cooperates in providing the progressively decreasing passage area toward the injector throat that produces the increase of velocity required for suction. Under such circumstances the valve plug should have a considerable range of adjustment, toward the opening 14, from an extreme open position where it is effective to produce a maximum useful suction at the venturi throat aperture 24, i.e. in combination with the nozzle 13, by virtue of the maximum water flow corresponding to this position. At this extreme open position of the useful range of plug positions, as well as at all other parts of the range, the dimensions of the parts are preferably such that the total annular area then occurring between the plug and the nozzle interior 13 is somewhat less than the smallest transverse area in the passage of the discharge element 20, i.e. in the valve seat 23. With this relation existing, transition of pressure energy to velocity, and consequent achievement of suction, will occur immediately before the venturi throat. The correspondingly increased area immediately after, i.e. downstream of the throat, permits free flow of the water jet plus such chlorine gas as is picked up and not instantaneously dissolved.

The shape of the plug 35 should also be such, e.g. as shown, that it will restrain the water jet (which the nozzle 13 directs into the outlet opening 23) from diverging or flaring out abruptly after its exit from the nozzle opening 14. A substantial divergence of the jet will cause loss of energy in the venturi throat and will reduce the ability of the injector to draw gas into the liquid.

Finally, the plug should preferably be shaped in such a manner as to break up the solid jet of water that might otherwise issue from the nozzle 13. That is to say, the extended portion 38 and flat end 39 of the plug, being shaped as indicated, cause a desirable degree of cavitation and turbulence in the jet as it projects into the tube 22, thereby facilitating contact and mixing of the chlorine into the water, without causing undesirable divergence of the jet.

Although other configurations of the plug 35 may be used, the shape and proportions shown in the drawing and described herein have been found specially adapted to satisfy all of the requirements outlined above, for maximum operating efficiency. In FIG. 1 the plug is shown at an intermediate point of adjustment; it can be withdrawn from or advanced into the nozzle by backing off or turning up the screw 49, thus respectively to enlarge or reduce the annular passage for water flow. Suction or negative pressure at the aperture 24 is decreased as the plug is moved further into the nozzle. In use of the device, such adjustment is made at the outset of operation, and ordinarily need not be changed except as conditions of water supply or requirements of vacuum may vary.

The maximum diameter of the valve plug, i.e. of its main body 36, is such that it can pass through the nozzle opening 14, for effective seating of the shoulder 37 against the annular seat 23; very preferably this diameter should be less by a small but appreciable amount than the diameter of the nozzle opening 14. By way of example: in one effective device, useful as part of a chlorinating system of the ordinary vacuum type, the nozzle has an opening 14 of ⅞ of an inch, with the flared wall 13 being a frustum of a cone having an apex angle of 60°. The valve seat 23 has a 45° bevel, to an inner opening having a diameter of about 0.812 inch. The diameter of the main plug body 36 is 0.86 inch, and the length of the extension 38 is ¼ inch, the overall length of the plug from the abutting end of the stem 40 to the flat face 39 being 1¼ inches. The diameter of the extension 38 is 0.75 inch.

For actuation of the valve device to close the injector and shut off chlorine feed, an inlet pipe 54 in the wall of member 42 is provided for applying fluid under pressure to the chamber 47, i.e. for exerting force on the cup 43 and diaphragm 52 to oppose the pressure of the flowing water and to permit full displacement of the valve plug by the spring 50. Upon admitting such fluid, which may be water from the same inlet line as indicated at 16, the force holding the valve assembly in its position of FIG. 1 is opposed or equalized and the spring 50 shifts the assembly rapidly to closed position with the annular plug surface 37 engaging the valve seat 23.

In this closed relation of the parts, illustrated in FIG. 2, water flow and chlorine supply are fully shut off. Furthermore, with the preferred clearance between the valve plug body 36 and the nozzle opening 14, the water under pressure will promptly fill the jacket or chamber 29 and hold the valve check ball 33 firmly closed against the gas inlet 30, thus supplementing the normal function of the chlorine metering instrumentalities to interrupt gas flow when the vacuum or negative pressure is interrupted.

For further explanation of the operation, FIG. 1 shows diagrammatically certain of the elements which may be used in combination with the device in a chlorinator. Thus chlorine gas is supplied under pressure from a tank 60 through a pressure reducing valve 61, of regulating type such as to provide a constant pressure in the downstream conduit 62, e.g. a predetermined negative or subatmospheric pressure under the influence of the injector. The gas traverses a metering orifice 63 and a throttling or control valve 64, which may be used to adjust the actual rate of supply of chlorine. The chlorine flow is thus measurable by the pressure drop across the orifice 63. From the downstream side of the valve 64 the gas is conducted to the conduit 31, to be drawn into the water flow through the injector.

Under normal operating conditions, the stop screw 49 is turned to a point of adjustment of the valve plug 35 which provides the desired vacuum conditions, i.e. a conveniently larger negative pressure or vacuum than that which would be established between the orifice 63 and valve 64 for the maximum desired flow of chlorine, i.e. at the largest desired opening of the valve 64.

A suitable flow of water under positive pressure is supplied to the inlet 16 from a conduit 66, providing the described suction in the injector. Means are provided for directing water from the conduit 66 to the control chamber 47 at desired times, to shut off the injector and chlorine feed. Thus a branch pipe 67 leads to one port of a three-way valve 68, which has another port connected through the pipe 70 to the inlet 54 of the valve actuating chamber, and a third port connected through a pipe 71 to a drain or other outlet.

When the injector is operating to feed chlorine, the valve 68 is kept in the position shown in FIG. 1, connecting the pipes 70 and 71 so that the interior of the chamber 47 is at atmospheric pressure. When chlorination is to be interrupted, the valve 68 is turned to its alternate position (FIG. 2) connecting pipe 67 with pipe 70 and thus supplying water under pressure to the chamber 47. As explained above, with the pressure thus equal on opposite sides of the diaphragm 52, the spring 50 moves the valve plug 35 to its closed position, seated in the outlet opening 23. This fully interrupts the flow of water, and likewise closes the chlorine conduit, by the check valve 33. Since suction is then removed from the chlorine feed line 31, further, supplemental interruption of gas flow also occurs at the valve 61, which closes completely because the predetermined negative pressure cannot be reached at its downstream side.

To restore operation, the valve 68 is simply turned back to its original position (FIG. 1), relieving pressure in the chamber 47 and permitting the valve plug to be moved back, by pressure of water in the chamber 11, to its pre-set location.

It will now be seen that the injector device fulfills the several requirements stated above and provides rapid and effective interruption or restoration of chlorination while preventing any siphon-like or other flow of chlorine after shut-off, and while also affording means for adjustment of the water flow through the injector as necessary for efficient operation. The actuation of the valve plug, between open and shut-off positions, may be remotely and if desired, automatically controlled, e.g. by appropriate instrumentalities serving a function which is the same as or similar to the valve 68.

It is to be understood that the invention is not limited to the specific construction herein shown and described but may be carried out in other ways without departure from its spirit.

I claim:

1. An injector to carry a flow of fluid, for injection of another fluid therein, comprising passage means for the first-mentioned flow of fluid, internally shaped to provide a venturi and having a throat in said venturi, said passage means having an apertured region at a first part of said throat for admission of the second fluid and having a valve seat region downstream of and narrower than said apertured region, means for conducting the second fluid to said apertured region, plug valve means disposed in said passage means and displaceable between a position upstream of said apertured region, through said apertured region and into a position engaging said valve seat region for closing the passage means downstream of said apertured region, said passage means at and upstream of said throat region being positionally fixed relative to the valve seat region and being dimensioned to provide clearance around said plug valve means on displacement of the latter into engagement with the valve seat region, and means for positioning the plug valve means, including adjustable means engaging said valve means for adjusting its aforesaid open upstream position upstream of the throat to adjust the flow of the first fluid through the venturi, and displacing means for the plug valve means, controllable to displace the plug valve means from its said open position into the aforesaid passage-closing position, said means for conducting the second fluid to the apertured throat region comprising conduit structure extending to said region from a locality external to said passage means, and check valve means in said conduit structure at a locality thereof upstream of said throat region for closing said conduit structure upon increase of pressure therein intermediate said check valve means and said throat region.

2. An injector to carry a flow of fluid, for injection of another fluid therein, comprising passage means for the first-mentioned flow of fluid, said passage means including a suction-producing throat having a region apertured to receive the second fluid, said passage means comprising nozzle means extending into and internally tapered toward the throat from a point upstream thereof so that the downstream end of said nozzle means constitutes the introductory region of the throat immediately upstream of the apertured region, and said passage means comprising outlet conduit means providing a downstream part of said throat and extending away from said throat and having a region downstream of said apertured region which is narrower than said apertured region and which comprises an annular surface shaped to constitute a valve seat, and valve plug means disposed within the passage means and movable along said passage means and through the throat from a position upstream of the throat to a position of engagement with said valve seat, said nozzle means having its throat end dimensioned to permit passage of the plug means therethrough with clearance, said nozzle means being positionally fixed relative to said valve seat, and said valve seat of the conduit passage means being dimensioned to be closed upon engagement of the plug means therewith, and means for selectively positioning the plug means at and adjustably between the aforesaid positions, for varying the first-mentioned flow of fluid and for interrupting said flow downstream of the apertured throat region, said plug positioning means comprising actuating means connected to the plug means for displacing said plug means between said valve seat engaging position and and said open upstream position, said actuating means including means for arresting said plug means at said open position, adjustable to vary the location of said open position, and said injector including means for conducting the second fluid to the apertured region, and check valve means in said conducting means, kept open by the force of suction from said throat and adapted to be closed upon admission of fluid under pressure to said conducting means through the clearance around the plug means when said plug means is in the flow-interrupting position of engagement with the valve seat of the outlet conduit means.

3. An injector as described in claim 2, wherein said arresting means comprises adjustable stop means and said actuating means comprises means movable with the plug means, biased to abut the stop means.

4. An injector as described in claim 3, wherein the movable means comprises diaphragm means under force of fluid pressure in the passage means, and wherein the actuating means also includes a supplemental chamber opening on said diaphragm means and adapted to receive fluid under pressure for opposing the biasing force of fluid pressure in the passage means, and means acting on the movable means to displace the plug means to flow-interrupting position when fluid under pressure is received in the supplemental chamber.

References Cited in the file of this patent

UNITED STATES PATENTS

| 409,046 | Lange | Aug. 13, 1889 |
| 1,421,841 | Schmidt | July 4, 1922 |
| 2,300,642 | Booth | Nov. 3, 1942 |
| 2,327,637 | Harris | Aug. 24, 1943 |
| 2,369,151 | Lingenbrink | Feb. 13, 1945 |
| 2,457,388 | Lung | Dec. 28, 1948 |

FOREIGN PATENTS

| 101,014 | Sweden | Mar. 4, 1941 |